US009293831B1

(12) United States Patent
Harker et al.

(10) Patent No.: US 9,293,831 B1
(45) Date of Patent: Mar. 22, 2016

(54) DIRECTIONAL SINGLE-AXIS HORN-REFLECTOR ANTENNA

(71) Applicant: L-3 Communications Corp., New York, NY (US)

(72) Inventors: Neil K. Harker, South Jordan, UT (US); Scott M. Lyon, South Weber, UT (US); Craig M. Norton, South Weber, UT (US); Douglas H. Ulmer, Midway, UT (US); Rory K. Sorensen, Kaysville, UT (US)

(73) Assignee: L-3 Communications Corp., New York, NY (US)

( * ) Notice: Subject to any disclaimer, the term of this patent is extended or adjusted under 35 U.S.C. 154(b) by 184 days.

(21) Appl. No.: 13/865,893

(22) Filed: Apr. 18, 2013

Related U.S. Application Data

(60) Provisional application No. 61/636,476, filed on Apr. 20, 2012.

(51) Int. Cl.
    *H01Q 3/12* (2006.01)
    *H01Q 13/02* (2006.01)
(52) U.S. Cl.
    CPC ..................... *H01Q 13/02* (2013.01)
(58) Field of Classification Search
    CPC ................................ H01Q 3/04; H01Q 13/12
    USPC .......................................... 343/786, 761, 840
    See application file for complete search history.

(56) References Cited

U.S. PATENT DOCUMENTS

| 3,646,565 A * | 2/1972 | Robinson et al. ......... 343/781 R |
| 4,574,289 A * | 3/1986 | Henderson .................... 343/786 |
| 6,556,174 B1 | 4/2003 | Hamman |

OTHER PUBLICATIONS

Robert Dolp, Winfried Mayer, Wilfried Grabherr; Industrialization of a 58 GHz High Gain Flat Panel Antenna Design using Injection Molding Technique, 29th European Microwave Conference, 1999, pp. 13-15.

Eduardo B. Lima, Jorge R. Costa, Carlos A. Fernandes; Mechanical Beam-Steerable Elliptical Dome Lens, 3rd European Conference on Antennas and Propagation, 2009, pp. 1814-1818.

* cited by examiner

*Primary Examiner* — Dieu H Duong
(74) *Attorney, Agent, or Firm* — Workman Nydegger

(57) ABSTRACT

A horn-reflector antenna for tracking the location of in-flight aircraft is provided. The antenna includes an upwardly-opening horn having a reflector attached thereto. The horn may have an asymmetric rectangular cross-section and comprise at least one upwardly and outwardly extending side wall. The reflector includes a reflecting surface that may have a generally hyperbolic paraboloid shape or saddle shape. The horn and reflector may be constructed from a polymer material in an injection molding process. The reflecting surface of the reflector and the inner surfaces of the horn may be coated with a reflective or conductive material, for example, a paint comprising sliver-plated copper particles. In use, the horn-reflector antenna may be adapted to rotate around the longitudinal axis of a stationary waveguide feed. As such, the antenna of the present invention can be adapted for operation without the use of a rotary joint or a slip ring.

18 Claims, 7 Drawing Sheets

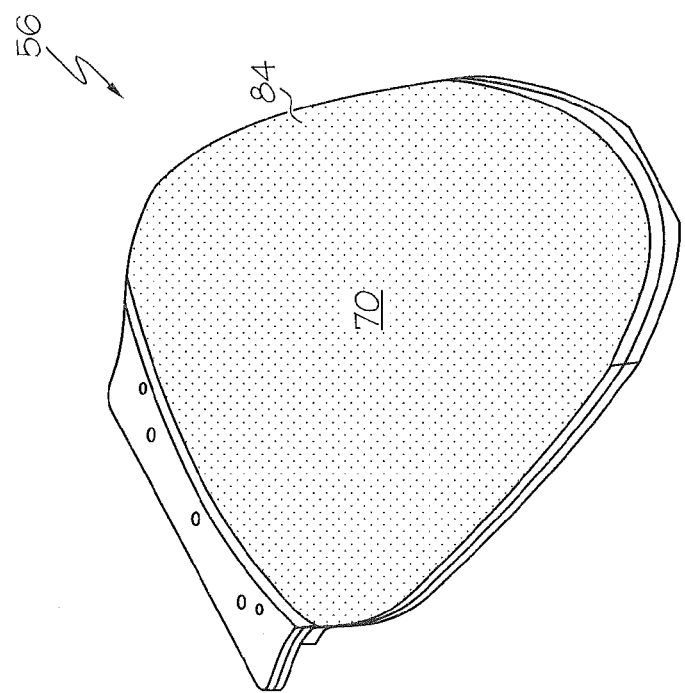
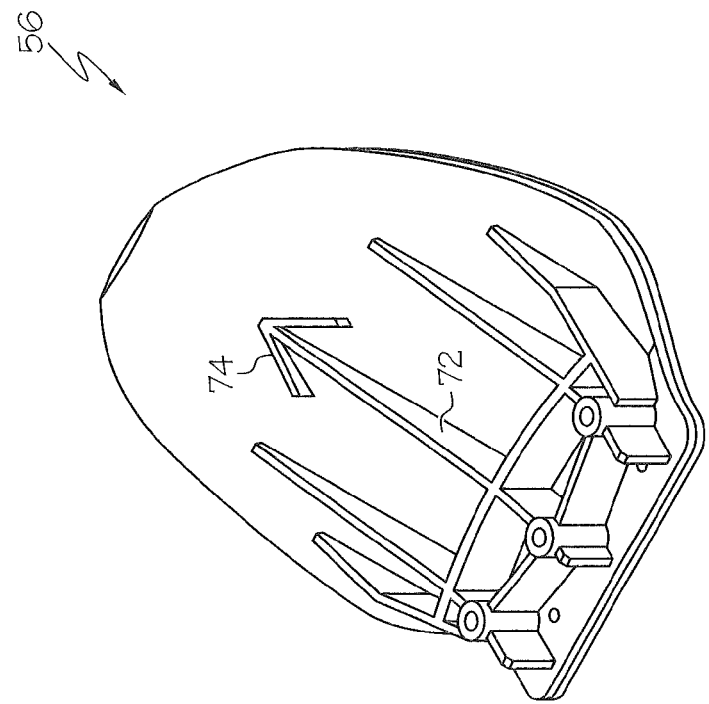

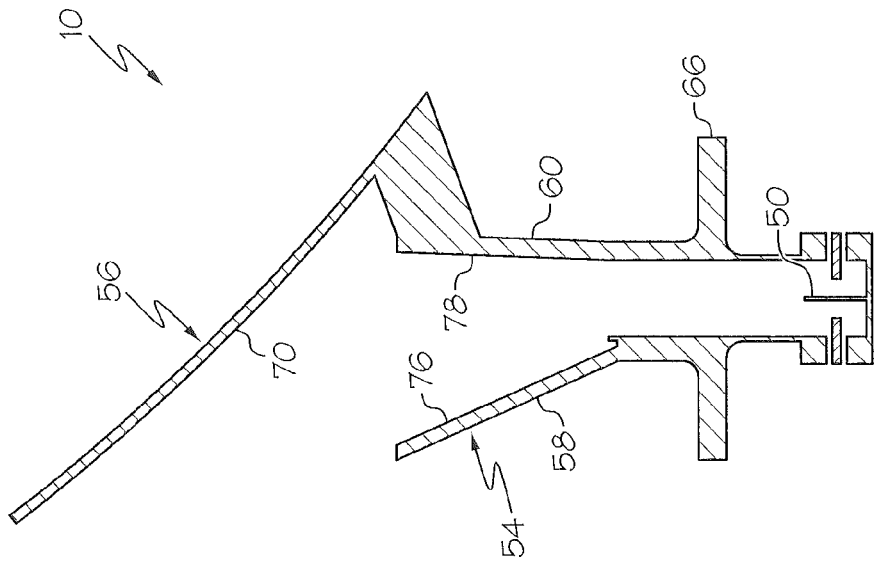
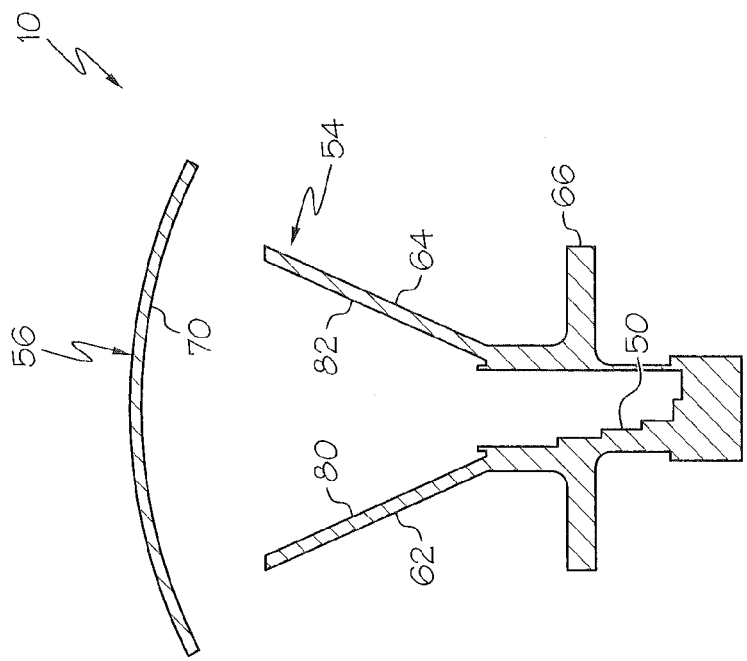

DIRECTIONAL SINGLE-AXIS HORN-REFLECTOR ANTENNA

CROSS-REFERENCE TO RELATED APPLICATIONS

This Application claims priority to U.S. Provisional Application Ser. No. 61/636,476, filed Apr. 20, 2012 to Rory K. Sorensen, et al. entitled "Directional Single-Axis Antenna Assembly and Method," the entire disclosure of which is incorporated herein by reference.

BACKGROUND OF THE INVENTION

It is often necessary to track the location of an aircraft or other object in flight. This tracking may occur through use of a portable tracking system in a remote locale. Many tracking applications require an antenna system capable of scanning 360° in azimuth, i.e., a horizontal scan. Typically, a rotatable antenna utilizing a rotary joint or slip ring is employed, wherein a waveguide feed is rotated along with the antenna. Rotary joints and slip rings have been known to be unreliable, especially where the rotational speed of the antenna is substantial and where extended periods of continuous use are required. Additionally, rotary joints and slip rings configured for operation at millimeter wave frequencies can be difficult and expensive to manufacture.

When tracking aircraft, single-axis antennas are often limited by the relatively narrow range of degrees above horizontal in which they can effectively track. As an aircraft increases or decreases in altitude or travels closer to or further from the antenna, such an antenna may have difficulty continuing to track the aircraft.

As such, a need exists for a rotatable antenna system which avoids the problems associated with a rotary joint or slip ring. A need also exists for a single-axis antenna that can track an aircraft through a larger range of degrees above horizontal. A further need exists for a single-axis antenna having characteristics of a directional antenna in azimuth and an omnidirectional antenna in elevation (i.e., vertical) or, in other words, a fan-beam type radiation pattern.

BRIEF SUMMARY OF THE INVENTION

The present invention involves the provision of an antenna for tracking the position of in-flight aircraft and other objects, the antenna generally comprising an upwardly-opening horn having a reflector attached thereto. The horn may have an asymmetric rectangular cross-section and comprise a front wall, a rear wall and two opposing side walls. In one embodiment, the front wall and side walls extend at a predetermined angle in an upwardly and outwardly direction such that a transverse cross section of the horn increases continuously from a bottom end of the horn to a top end of the horn. In the same embodiment, the back wall may extend upward in a substantially vertical direction.

The antenna's reflector includes a reflecting surface having a curved profile in two axes. The reflecting surface can have a generally hyperbolic paraboloid shape. In other words, the reflecting surface may be saddle-shaped and have a negative curvature in a longitudinal direction and a positive curvature in a transverse direction. In one embodiment, the reflector is attached to the horn such that a top surface of the horn and a plane generally tangent to the reflecting surface intersect at an angle of about 45°.

The horn and reflector may be constructed from a polymer material in an injection molding process. The reflecting surface of the reflector and the inner surfaces of the horn may be coated with a layer of reflective or conductive material, for example, a paint comprising sliver-plated copper particles. In use, the horn and reflector may be adapted to rotate together around the longitudinal axis of a stationary vertically-oriented waveguide feed. As such, the antenna of the present invention can be adapted for operation without the use of the rotary joint or a slip ring.

Other and further objects of the invention, together with the features of novelty appurtenant thereto, will appear in the course of the following description.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views:

FIG. 6A is a top perspective view of a reflector portion of a horn-reflector antenna in accordance with one embodiment of the present invention;

FIG. 6B is a bottom perspective view of a reflector portion of a horn-reflector antenna in accordance with one embodiment of the present invention;

FIG. 7A is a schematic cross-sectional view of a horn-reflector antenna taken about a transverse plane in accordance with one embodiment of the present invention and FIG. 7B is a schematic cross-sectional view of a horn-reflector antenna taken about a longitudinal plane in accordance with one embodiment of the present invention.

DETAILED DESCRIPTION OF THE INVENTION

Figure 1:
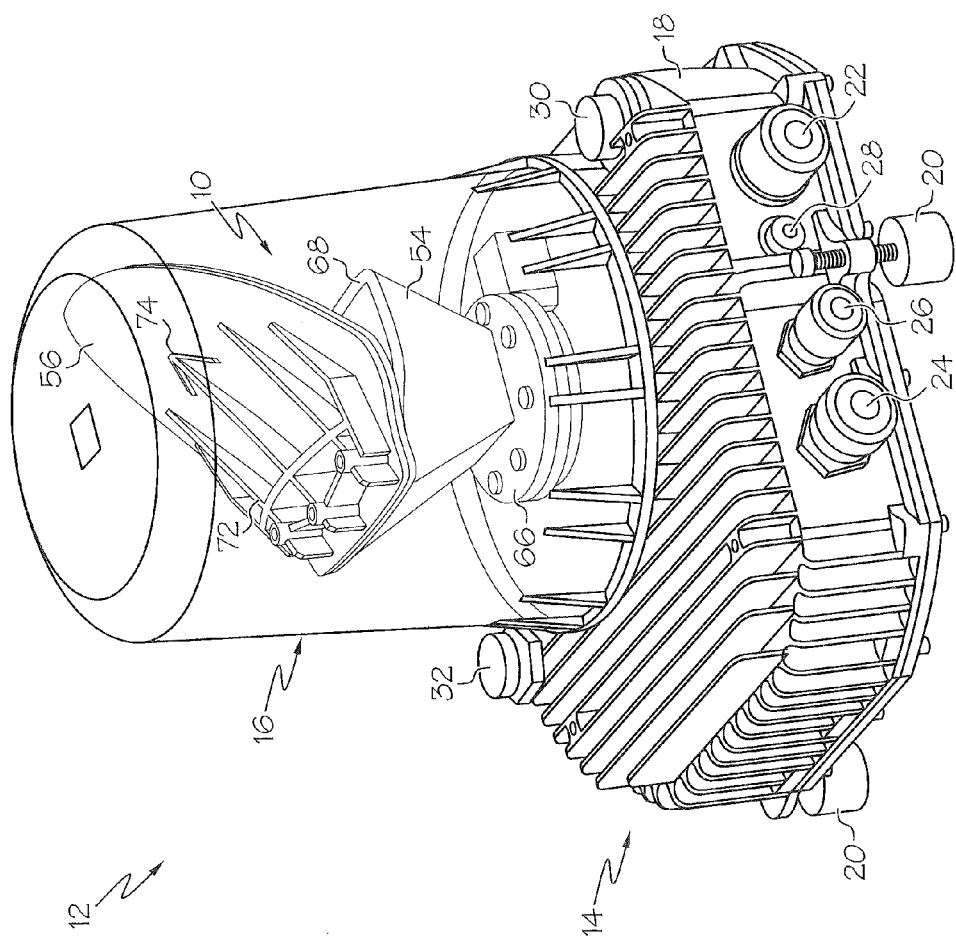
FIG. 1 is a perspective view of an antenna assembly including a horn-reflector antenna in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Referring to the figures and with particular reference to FIG. 1, the present invention is directed generally to a unique horn-reflector antenna 10 that may be provided for use with an antenna assembly 12 suitable for tracking a large variety of aircraft, including manned and unmanned aerial vehicles (UAVs), and other objects of various sizes and traveling at various speeds in flight or orbit. In one embodiment, the antenna assembly 12 is configured to be mobile and man-packable, and can be transported, moved and set up by a single person.

The antenna assembly 12 may include, in addition to the horn-reflector antenna 10, a base 14 and radome 16. The base 14 may be comprised of a housing 18 and include various features such as leveling feet 20, a power/logic port 22, transmitter (Tx) port 24, receiver (Rx) port 26, light-emitting diode (LED) 28, bubble level 30 and vent 32.

Figure 2:
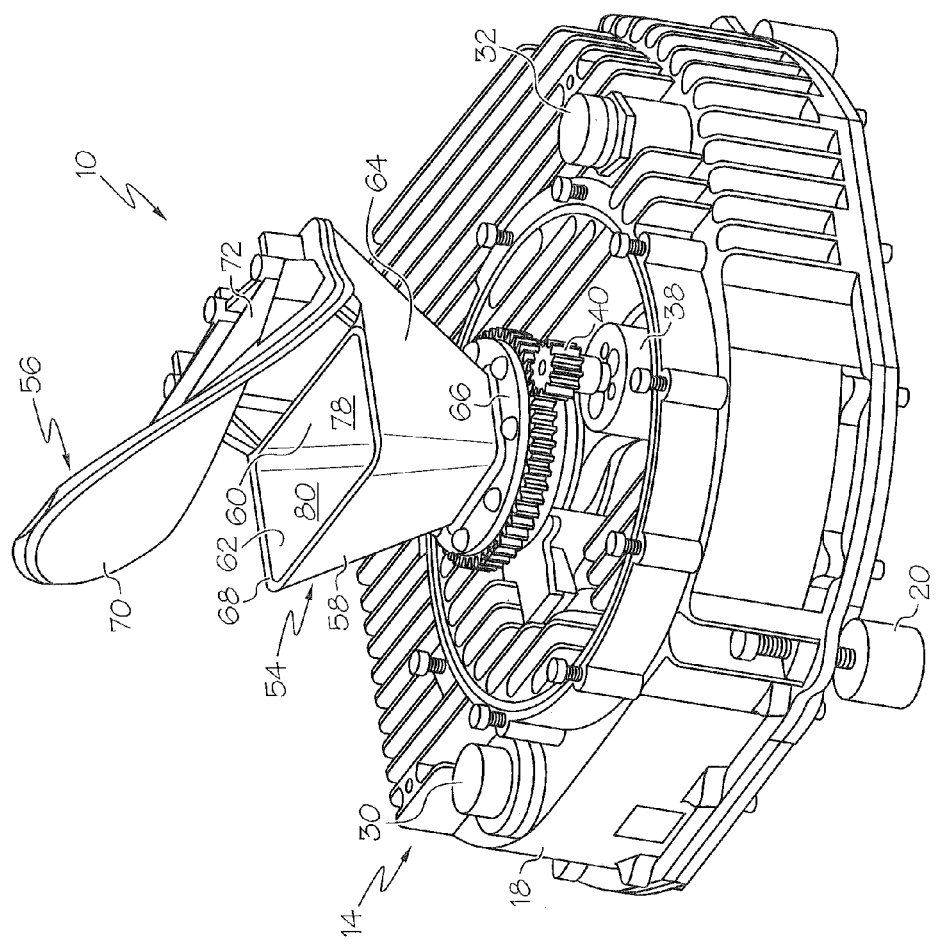
FIG. 2 is a perspective view of an antenna assembly including a horn-reflector antenna in accordance with one embodiment of the present invention.
Figure 3:
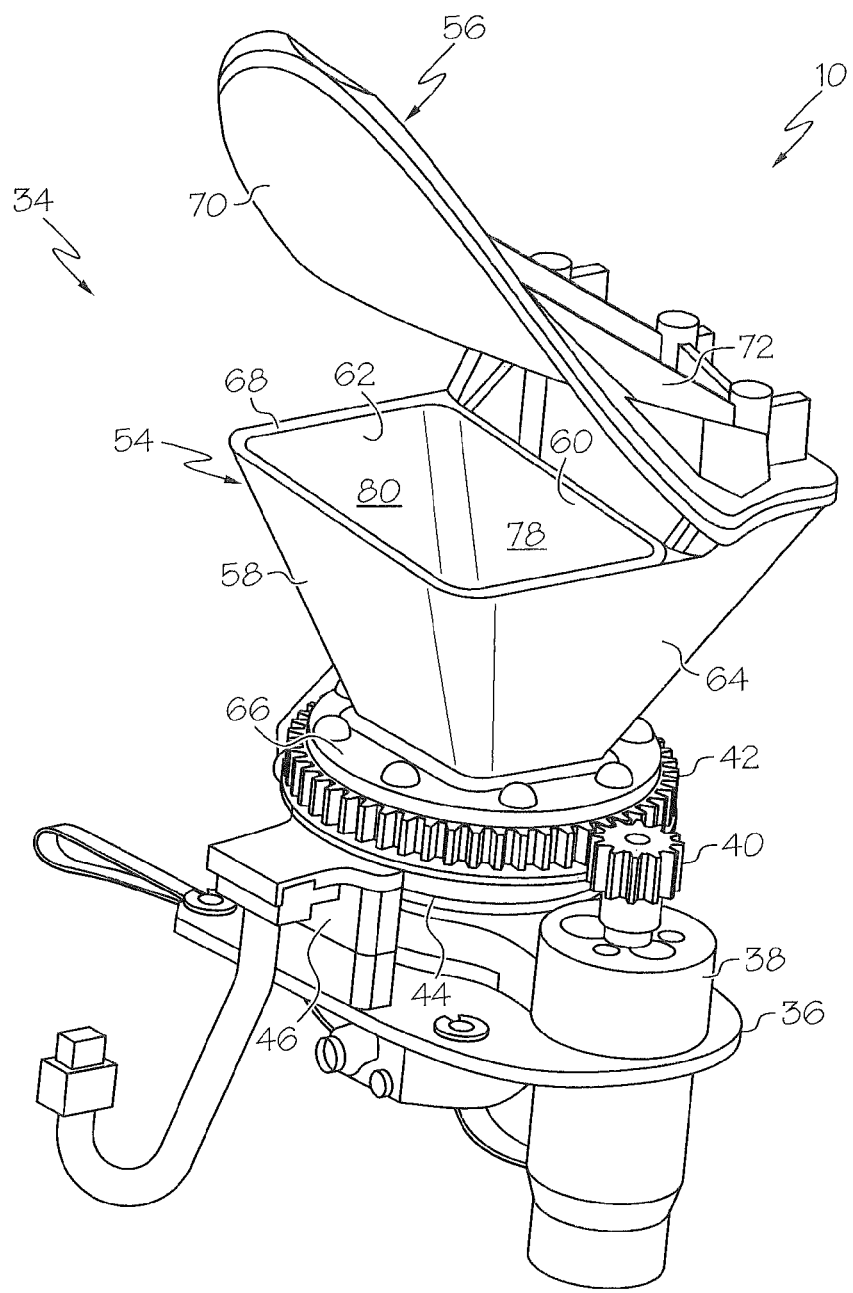
FIG. 3 is a perspective view of an antenna subassembly including a horn-reflector antenna in accordance with one embodiment of the present invention.
Figure 4:
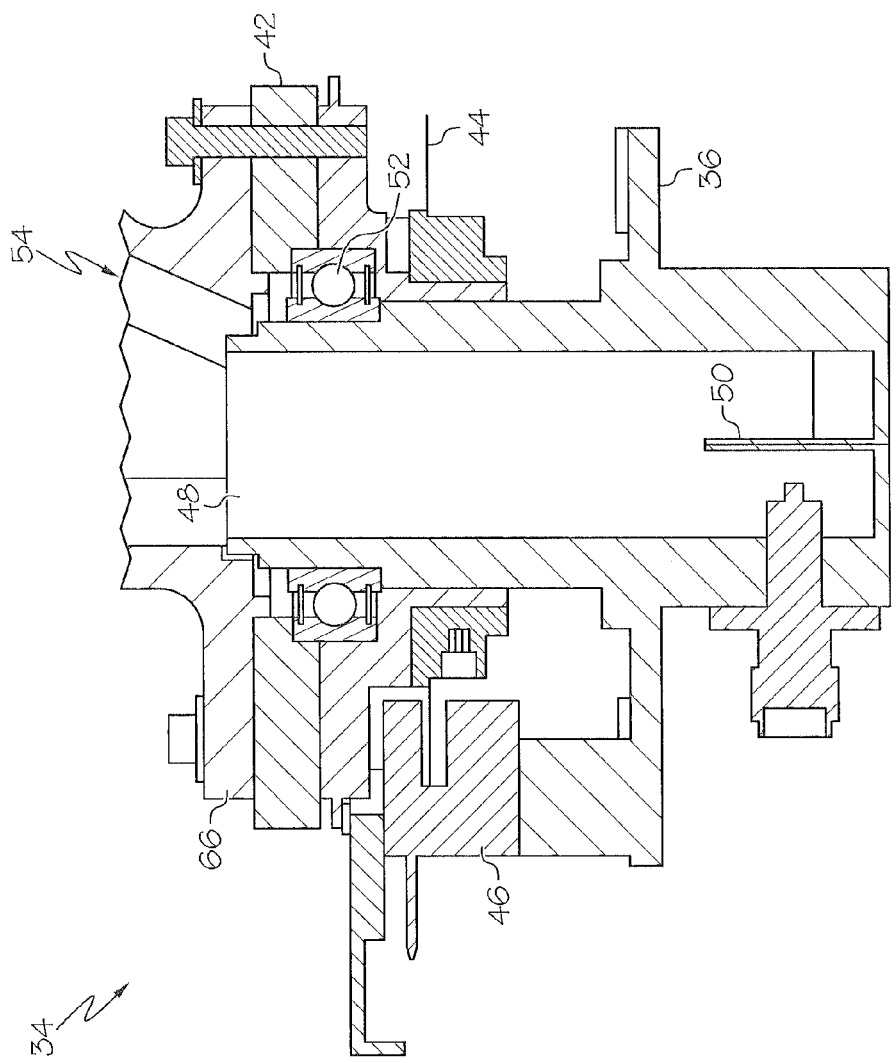
FIG. 4 is an enlarged partial cross-sectional view of a horn-reflector antenna rotatably coupled to a waveguide feed in accordance with one embodiment of the present invention.

As illustrated in FIG. 3, the horn-reflector antenna 10 may be part of a subassembly 34 comprised of a mount plate 36, a motor 38 having a pinion gear 40 attached to its output shaft, a pedestal gear 42 attached to a lower end of the antenna 10 and configured to be driven by the pinion gear 40, an encoder having a disc or wheel 44 that rotates with antenna and a reader 46 for measuring the angular position of the antenna 10. As shown in FIG. 4, the mounting plate 36 includes a cylindrical waveguide feed 48 extending therethrough. The waveguide feed 48 includes a septum polarizer 50 having a stepped configuration, as shown in FIG. 7A. The antenna can be rotatably coupled to a top end of the waveguide feed 48 by a bearing 52. As depicted in FIG. 2, the subassembly 34 is mounted within the housing 18 of the base 14.

The horn-reflector antenna 10 of the present invention is comprised generally of a horn 54 and shaped reflector 56, and may be integrally formed as a single component or formed as two or more individual components that are then assembled. In one embodiment, the horn 54 and reflector 56 are formed separately and then attached together with fasteners (not shown) to form the antenna 10.

The horn 54 and reflector 56 may be constructed of any suitable material, including but not limited to plastic or polymer materials, metallic materials, fiber materials, composite materials or any other suitable materials now known or hereafter developed. In one embodiment, the horn 54 and reflector 56 are constructed of a polycarbonate resin known as Lexan®. When constructed of a polymer or other suitable material, the horn 54 and reflector 56 can be formed using an injection molding process.

The horn 54 may have an asymmetric rectangular profile including a front wall 58, rear wall 60 and opposing side walls 62 and 64. One or more of the horn's 54 walls may extend upwardly and outwardly at a predetermined angle of flare. In one embodiment, as best depicted in FIGS. 7A and 7B, the front wall 58 and side walls 62 and 64 extend upwardly and outwardly from the horn's lower end. In that same embodiment, the horn's 54 rear wall 60 may extend generally straight up or may be slightly inclined. It will be appreciated that a transverse cross section of the horn 54 may increase continuously from a bottom end of the horn 54 to a top end of the horn 54. In other cases, one or more of the horn's 54 front wall 58 and side walls 62 and 64 may extend directly upwardly and not extend or flare in an outward direction. It will further be appreciated that the horn 54 may take on other shapes and dimensions. For example, the horn's 54 cross-section may have a profile that is generally round, circular, oval, rectangular, square, polygonal or other suitable shape.

The reflecting surface 70 of the reflector 56, in one embodiment, has a hyperbolic paraboloid shape, or saddle shape, as illustrated in the accompanying figures. In this embodiment, the reflector 56 has an oval, curved-shape profile somewhat similar to that of a Pringles® potato chip and sweeps upwardly away from the horn 54. The reflector 56 may additionally be described as having a negative curvature in a longitudinal direction and a positive curvature in a transverse direction. However, depending upon the requirements of the antenna 10, it will be appreciated that the reflector 56 may be other shapes and profiles, including round, circular, oval, rectangular, square, polygonal, curved, flat, and other suitable shapes and profiles. The horn 54 and reflector 56 shapes are designed to provide an optimal gain profile (i.e., radiation pattern) for the antenna 10, which facilitates both tracking and radio frequency (RF) performance. A mounting flange 66 extending radially outwardly from the bottom of the horn 54 may be provided for attaching the horn 54 to the pedestal gear 42. As best shown in FIG. 6A, the reflector 56 may further include support ribs 72 for added structural rigidity and strength and an arrow 74 marked thereon to inform a user of an antenna's pointing direction.

The reflector 56 is attached to the horn 54 such that the top surface 68 of the horn and a plane generally tangent to the reflecting surface 70 intersect at an angle. The reflector may be attached to the horn at any suitable angle between 0° and 90°, including angles between about 30° and 60° in one embodiment and 40° and 50° in another embodiment. In one preferred embodiment, the reflector 56 is attached to the horn 54 at an angle of about 45°. It will be appreciated that the reflector 56 may be attached to the horn 54 at a fixed angle or may be attached such that the angle is adjustable. The reflector 56 may be integrally formed with the horn 54 or formed separately and subsequently affixed thereto.

Figure 5:
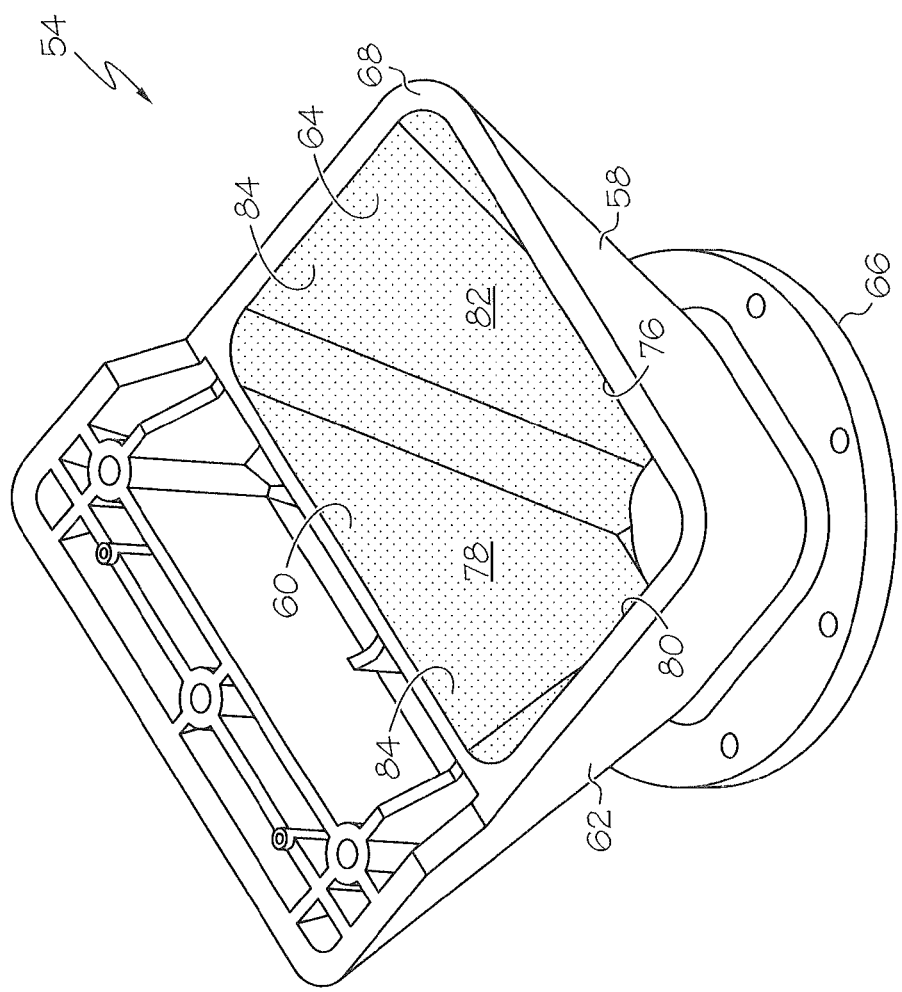
FIG. 5 is a top perspective view of a horn portion of a born-reflector antenna in accordance with one embodiment of the present invention.

As shown in FIGS. 5 and 6B, the inner surfaces 76, 78, 80 and 82 of the horn 54 and the reflecting surface 70 of the reflector 56 may be at least partially coated or lined with a reflective and/or conductive metallic material 84 in order to provide a path for RF signals to propagate through the antenna 10 and radiate therefrom. The material may be a reflective material, such as a carbon-based material that frequencies (e.g., Ku band, Ka band, other frequencies, etc.) will reflect off of, or it may be a conductive material. It will be appreciated that the material does not necessarily need to be a conductive material for the frequencies to reflect off of it. The material 84 may be in the form or a thin sheet or foil (e.g., copper tape) or may be in the form of particles. In one embodiment, the material 84 comprises particles (e.g., copper particles), some or all of which may be optionally plated with silver. The material 84 can be a conductive and/or reflective paint product, such as for example those manufactured by the Spraylat Corporation in its Series 599 SOS paint line, including its B3755 silver-coated copper paint, B3740 hybrid paint and B3730 silver paint.

The horn-reflector antenna 10 rotates about a stationary waveguide feed 48 and can be rotatably connected thereto via a bearing 52, such as a ball bearing or any other suitable bearing now known or hereafter developed. The antenna 10 can be steered in a single axis (e.g., azimuth) without utilizing an RF rotary joint or slip ring. The lack of an RF rotary joint and slip ring minimizes the assembly's 12 size, minimizes RF losses and variations, improves reliability, renders the assembly 12 better suited for simple manufacturing and assembly, and makes the assembly 12 more robust in meeting environmental requirements.

The antenna 10 of the present invention is designed to maximize the coverage for a large variety of aircraft operations. The overall size, shape and configuration of the antenna 10, including the shape of the reflecting surface 70 of the reflector 56, produces a fan-beam radiation pattern that provides elevation coverage while being steered in azimuth. The broad elevation beam enables the antenna 10 such that it only has to be swept in the azimuth axis and eliminates a need for pointing in elevation. As such, only single-axis control (in azimuth) of the antenna 10 is required as opposed to dual-axis or three-axis control. This not only results in a manufacturing cost savings, but also reduces the dependency on rotary joints and/or slip rings. In an alternative embodiment, the antenna 10 may be rotated 90° from its typical orientation such that it would provide azimuth coverage while being steered in elevation.

The fan-beam radiation pattern created by the antenna 10 exhibits characteristics of a directional antenna in azimuth and an omnidirectional antenna in elevation. In the alternative embodiment mentioned above where the antenna 10 is rotated 90° from its typical orientation, the fan-beam radiation pattern created by the antenna 10 exhibits characteristics of a directional antenna in elevation and an omnidirectional antenna in azimuth. With regard to the first embodiment above, the antenna 10 can, therefore, track an aircraft as the aircraft moves in the horizontal direction with respect to the antenna 10. Additionally, as the aircraft increases or decreases in altitude or travels closer or further from the antenna 10, the fan-beam pattern has enough energy to compensate for any movement in the vertical direction with respect to the antenna 10.

The antenna 10 is designed to provide an optimal gain profile (i.e., radiation pattern) that facilitates both tracking and RF performance. In one embodiment, the antenna 10 is designed to ensure that a positive circularly polarized gain (i.e., >0dBic) is achieved from the horizon (i.e.,) 0° to an angle of about 70° or more above the horizon. In typical embodiments of a horn attached to an angled reflector, a null appears in the elevation radiation pattern cut (e.g., around) 45°. The unique shape of the horn 54 and reflector 56 in the present invention shifts this null from about 45° to greater than 70° above the horizon. This provides much broader elevation coverage for aircraft with no drop-outs or suck-outs in the RF signal/link.

The antenna 10 may be configured such that the dominant peak in gain (i.e., main beam/lobe) is located between about 5° and 8° above the horizon in elevation and, in one embodiment, is located roughly 6° above the horizon. This allows a peak gain to occur when an aircraft is just above the horizon, which is often the case unless the aircraft is relatively close in proximity to the antenna 10. Additionally, more gain is needed when the aircraft is further away from the antenna 10 and, thus, positioned close to the horizon. As the aircraft approaches the antenna 10, less gain can be afforded. The location of the peak gain can be adjusted from embodiment to embodiment by adjusting the shape, profile and/or angle of the reflector 56 and its reflecting surface 70. In one embodiment, the reflector 56 may be removed and replaced with a reflector of a different size, shape, profile and/or angle. In such an embodiment, the antenna 10 may be "tuned" or modified by simply swapping the reflector 56 or adjusting or moving the reflector 56 already attached to the horn 54.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An antenna for tracking the position of in-flight aircraft, said antenna comprising:
   an upwardly-opening horn having a front wall, a rear wall and two opposing side walls, said rear wall extending substantially straight upwardly from a bottom end of the horn, at least one of said front and two opposing side walls having a predetermined angle of outward flare from the bottom end of the horn such that a transverse cross section of said horn increases from the bottom end of the horn to a top end of the horn; and
   a reflector attached to said horn, said reflector including a reflecting surface having a curved profile,
   wherein said horn and reflector rotate together around a longitudinal axis of a stationary waveguide feed to thereby create a mechanically-steered fan-beam radiation pattern.

2. The antenna of claim 1, wherein said reflecting surface has a generally hyperbolic paraboloid shape.

3. The antenna of claim 1, wherein said reflecting surface is generally saddle-shaped.

4. The antenna of claim 1, wherein said reflecting surface has a negative curvature in a longitudinal direction and a positive curvature in a transverse direction.

5. The antenna of claim 1, wherein said horn has an asymmetric rectangular cross-section.

6. The antenna of claim 5, wherein said front wall and said side walls extend upwardly and outwardly.

7. The antenna of claim 1, wherein said reflecting surface has a profile that is at least one of a round, circular, oval, rectangular, square, polygonal, curved or flat shape and said horn has a cross-section having a profile that is at least one of a round, circular, oval, rectangular, square or polygonal shape.

8. The antenna of claim 1, wherein at least one of said horn and said reflector is constructed of an injection molded polymer material.

9. The antenna of claim 1, wherein said reflecting surface is coated with a layer of reflective or conductive material.

10. The antenna of claim 9, wherein said reflective or conductive material is a paint comprising silver particles or sliver-plated copper particles.

11. The antenna of claim 1, wherein at least one of said horn and said reflector is constructed of a metallic material.

12. The antenna of claim 1, wherein inner surfaces of said horn are coated with a reflective and conducting paint comprising silver particles or sliver-plated copper particles.

13. The antenna of claim 1, wherein said reflector is attached to said horn such that a top surface of said horn and a plane generally tangent to said reflecting surface intersect at an angle of between about 30 degrees and about 60 degrees.

14. The antenna of claim 1, wherein said reflector is attached to said horn such that a top surface of said horn and a plane generally tangent to said reflecting surface intersect at an angle of about 45 degrees.

15. The antenna of claim 1, wherein said antenna is adapted for use without a rotary joint or slip ring.

16. The antenna of claim 1, wherein said antenna has characteristics of a directional antenna in azimuth and an omnidirectional antenna in elevation.

17. The antenna of claim 1, wherein said antenna is adapted for creating a fan-beam radiation pattern having coverage from 0° to about 70° with a peak gain between about 5° and 8°.

18. An antenna for tracking the position of in-flight aircraft, said antenna comprising:
- an upwardly-opening horn having asymmetric rectangular cross-section and including a front wall, a rear wall and two opposing side walls, wherein said rear wall extends substantially straight upwardly from a bottom surface of the horn, wherein said front wall and said side walls are flared outwardly from the bottom surface of the horn; and
- a reflector attached to said horn, said reflector including a reflecting surface having a generally hyperbolic paraboloid shape and being coated with a reflective and conductive material comprising sliver-plated copper particles;
- wherein said horn and said reflector are constructed of an injection molded polymer material;
- wherein said reflector is attached to said horn such that a top surface of said horn and a plane generally tangent to said reflecting surface intersect at an angle of about 45 degrees,
- wherein said horn and reflector rotate together around a longitudinal axis of a stationary waveguide feed to thereby create a mechanically-steered fan-beam radiation pattern.

* * * * *